United States Patent
Chung (10) Patent No.: US 10,904,162 B2
(45) Date of Patent: Jan. 26, 2021

(54) SYSTEM AND METHOD FOR SELECTING OPTIMAL PATH IN MULTI-MEDIA MULTI-PATH NETWORK

(71) Applicant: ELECTRONICS AND TELECOMMUNICATIONS RESEARCH INSTITUTE, Daejeon (KR)

(72) Inventor: Byung Chang Chung, Daejeon (KR)

(73) Assignee: ELECTRONICS AND TELECOMMUNICATIONS RESEARCH INSTITUTE, Daejeon (KR)

(*) Notice: Subject to any disclaimer, the term of this patent is extended or adjusted under 35 U.S.C. 154(b) by 0 days.

(21) Appl. No.: 16/707,015

(22) Filed: Dec. 9, 2019

(65) Prior Publication Data
US 2020/0195577 A1 Jun. 18, 2020

(30) Foreign Application Priority Data
Dec. 17, 2018 (KR) .................... 10-2018-0162801

(51) Int. Cl.
*H04L 12/911* (2013.01)
*G06N 3/08* (2006.01)
(Continued)

(52) U.S. Cl.
CPC ............ *H04L 47/822* (2013.01); *G06N 3/08* (2013.01); *H04L 65/1023* (2013.01); *H04L 65/60* (2013.01); *H04L 67/30* (2013.01)

(58) Field of Classification Search
CPC ... H04L 47/822; H04L 65/1023; H04L 65/60; H04L 67/30; G06N 3/08
See application file for complete search history.

(56) References Cited

U.S. PATENT DOCUMENTS

| 9,832,103 | B2 | 11/2017 | Heo et al. |
| 2007/0002748 | A1* | 1/2007 | Nakata ............... H04L 45/00 370/238 |

(Continued)

FOREIGN PATENT DOCUMENTS

| JP | 2010130032 A | * | 6/2010 |
| KR | 10-2017-0069807 A | | 6/2017 |

(Continued)

OTHER PUBLICATIONS

"Tomohiro Saito, Yutaka Watanonbe, Learning Path Recommender System based on Recurrent Neural Network, Sep. 1, 2019, IEEE, 2018 9th International Conference on Awareness Science and Technology (iCAST)" (Year: 2018).*

*Primary Examiner* — Christopher B Robinson
(74) *Attorney, Agent, or Firm* — LRK Patent Law Firm (57) ABSTRACT

A system and method for selecting an optimal path in a multi-media multi-path network. The system for selecting an optimal path in a multi-media multi-path network includes a memory storing a program for selecting an optimal path in the multi-media multi-path network and a processor for executing the program, wherein the processor uses a network performance parameter, which serves as state information, as an input value of a reinforcement learning algorithm and selects an optimal path using a Q-table obtained by applying the reinforcement learning algorithm.

9 Claims, 8 Drawing Sheets

(51) Int. Cl.
*H04L 29/08* (2006.01)
*H04L 29/06* (2006.01)

(56) References Cited

U.S. PATENT DOCUMENTS

| | | | |
|---|---|---|---|
| 2016/0149871 A1 | 5/2016 | Heo et al. | |
| 2017/0063699 A1 | 3/2017 | Kim | |
| 2017/0105163 A1* | 4/2017 | Hu | G06N 7/005 |
| 2019/0232488 A1* | 8/2019 | Levine | B25J 9/1664 |

FOREIGN PATENT DOCUMENTS

| | | |
|---|---|---|
| KR | 10-2017-0116882 A | 10/2017 |
| KR | 10-1859382 B1 | 5/2018 |
| KR | 10-1941362 B1 | 1/2019 |

\* cited by examiner

SYSTEM AND METHOD FOR SELECTING OPTIMAL PATH IN MULTI-MEDIA MULTI-PATH NETWORK

CROSS-REFERENCE TO RELATED APPLICATION

This application claims priority to and the benefit of Korean Patent Application No. 10-2018-0162801, filed on Dec. 17, 2018, the disclosure of which is incorporated herein by reference in its entirety.

BACKGROUND

1. Field of the Invention

The present disclosure relates to a system and method for selecting an optimal path in a multi-media multi-path network.

2. Description of Related Art

The quality of a multi-media multi-path system that a user may experience or the quality of a service thereof varies greatly on how to select a path.

The related art is limited in that resources cannot be efficiently used when a terminal uses the multi-media multi-path system.

SUMMARY OF THE INVENTION

To address the above-mentioned problems, the present disclosure is directed to providing a system and method for selecting an optimal path in a multi-media multi-path network by defining input value elements to be input to a reinforcement learning algorithm and pre/post-processing processes for effective reinforcement learning.

According to one aspect of the present disclosure, a system for selecting an optical path in a multi-media multi-path network includes a memory storing a program for selection of an optimal path in the multi-media multi-path network, and a processor configured to execute the program, wherein the processor uses a network performance parameter, which serves as state information, as an input value of a reinforcement learning algorithm and selects an optimal path using a Q-table obtained by applying the reinforcement learning algorithm.

According to another aspect of the present disclosure, a method of selecting an optical path in a multi-media multi-path network includes (a) performing pre-processing to define an input value of a reinforcement learning algorithm for selection of an optimal path in the multi-media multi-path network; (b) obtaining a Q-table by applying the reinforcement learning algorithm to the input value; and (c) selecting an optimal path using the Q-table.

BRIEF DESCRIPTION OF THE DRAWINGS

The above and other objects, features and advantages of the present disclosure will become more apparent to those of ordinary skill in the art by describing exemplary embodiments thereof in detail with reference to the accompanying drawings, in which.

DETAILED DESCRIPTION OF EXEMPLARY EMBODIMENTS

The above-described aspects, other aspects, advantages and features of the present disclosure and methods of achieving them will be apparent from the following description of embodiments described below in detail in conjunction with the accompanying drawings.

However, the present disclosure is not limited to embodiments set forth herein but may be embodied in many different forms and these embodiments are merely provided to help those of ordinary skill in the art understand aspects, configuration, and effects of the present disclosure. Therefore, the scope of the present disclosure is defined by the following claims.

The terms used herein are for the purpose of describing embodiments only and are not intended to be limiting of the present disclosure. As used herein, singular forms are intended to include plural forms unless the context clearly indicates otherwise. As used herein, the terms "comprise" and/or "comprising" specify the presence of stated components, steps, operations and/or elements but do not preclude the presence or addition of one or more other components, steps, operations and/or elements.

Hereinafter, in order to help those of ordinary skill in the art to understand the present disclosure, the background art of the present disclosure will be described first and embodiments of the present disclosure will be described thereafter.

Before describing a multi-media multi-path system, MPTCP technology will be described below.

MPTCP stands for multi-path transmission control protocol (TCP) and refers to a technique for transmitting TCP via multiple paths.

Paths for multi-path transmission are mainly secured in a wired network, a cellular network (licensed band), a WLAN network (unlicensed band), or the like.

A terminal capable of performing MPTCP transmission secures two or more available paths.

Through the secured multiple paths, the terminal secures a wide bandwidth or higher survivability.

When the terminal is to obtain a wide bandwidth, a packet may be transmitted via the secured multiple paths by dividing the packet into several parts, thereby achieving an effect similar to frequency matching, and when high survivability is to be obtained, a packet containing duplicate content may be transmitted via the multiple paths, thereby compensating for loss or error occurring in a specific path.

Figure 1:
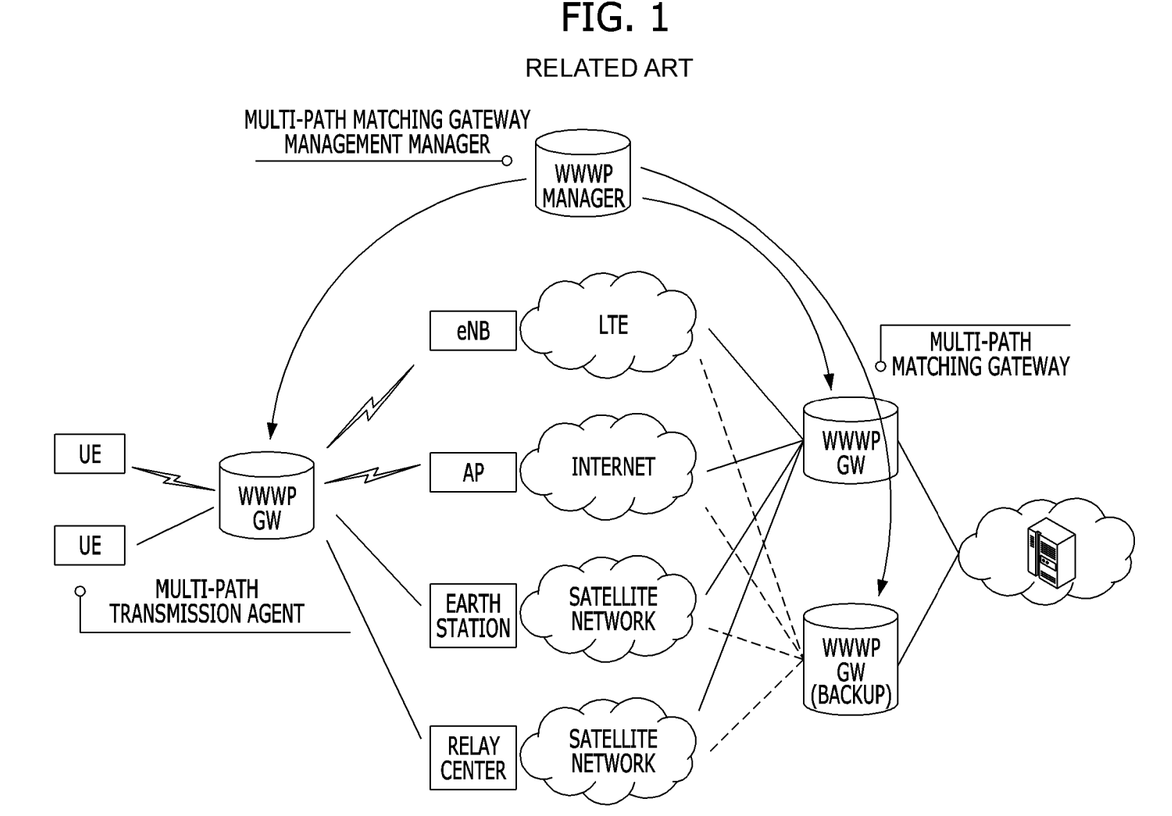
FIG. 1 illustrates a multi-media multi-path network system according to the related art.

A system that performs matching on the wired network, the cellular network, a satellite network, and the like using extension of MPTCP technology will be defined herein as a multi-media multi-path system as illustrated in FIG. 1.

A multi-path matching gateway is connected to various networks and receives a path selection result from a multi-path matching gateway management manager and performs transmission on the basis of this result.

For example, in the multi-media multi-path system, a terminal may use various network paths, such as one wired network path and one cellular network path, by matching.

A most important part of the multi-media multi-path network system is to solve a problem of how to select a path for each user or service.

The quality of the multi-media multi-path network system that a user may experience or the quality of a service thereof may vary greatly according to how a path is selected.

Network saturation may be prevented according to how various network resources are managed not only in terms of a user or a service but also from an overall network perspective.

To address the above-mentioned problem related to path selection, the present disclosure is directed to a configuration of multi-path selection in a multi-media multi-path network system and is specifically applicable to the field of network systems, in which multimedia such as a long-term evaluation (LTE) network, a Wi-Fi network, a wired network, and a satellite network exist and multi-path transmission technology can be used.

When a wired network is used by all users due to high quality of the wired network, the wired network is likely to be saturated and is vulnerable to information deprivation.

According to an embodiment of the present disclosure, resources of the multi-media multi-path network system may be used more efficiently.

According to an embodiment of the present disclosure, a path selection algorithm that reflects user/service requirements and changes in network quality in real time is applied. To this end, a reinforcement learning algorithm is employed, and input value elements to be input to the reinforcement learning algorithm and pre/post-processing processes are defined for effective reinforcement learning.

Figure 2:
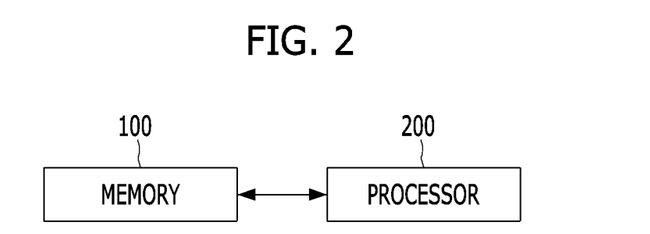
FIG. 2 is a diagram illustrating a system for selecting an optimal path in a multi-media multi-path network according to an embodiment of the present disclosure.

FIG. 2 is a diagram illustrating a system for selectin an optimal path in a multi-media multi-path network according to an embodiment of the present disclosure.

The system for selecting an optimal path in a multi-media multi-path network according to an embodiment of the present disclosure includes a memory 100 storing a program for selection of an optimal path in the multi-media multi-path network and a processor 200 for executing the program. The processor 200 uses network performance parameters, which serve as state information, as input values of a reinforcement learning algorithm and selects an optimal path using a Q-table obtained through application of the reinforcement learning algorithm.

According to an embodiment of the present disclosure, the network performance parameters include a round trip time (RTT) and input arrival rate information, and the processor 200 performs learning by matching the RTT with an action selection result of a previous section.

The processor 200 uses a predetermined RTT of a latest N-time previous section as an input value.

The processor 200 reflects the input arrival rate information as state information, together with path selection results for other services.

The processor 200 applies a deep Q learning algorithm to predict a Q-table and outputs information of a recommended path for a corresponding user and service.

In this case, the processor 200 selects a path considering whether multi-path transmission is to be performed and considering quality requirement values of the user and the service as user profile information and service profile information.

The processor 200 performs learning considering asynchronicity between an action and a reward using a time buffer.

Figure 3:
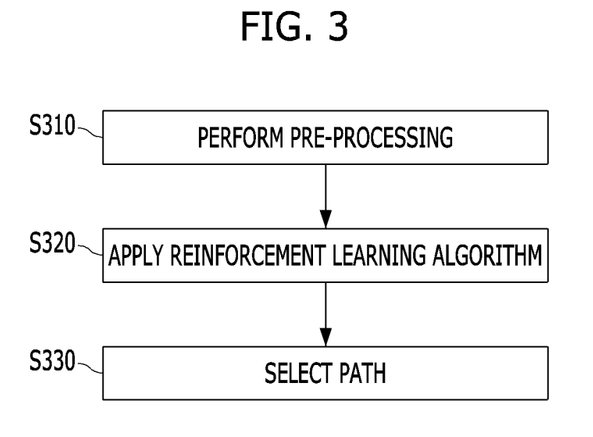
FIG. 3 is a flowchart of a method of selecting an optimal path in a multi-media multi-path network according to an embodiment of the present disclosure.

FIG. 3 is a flowchart of a method of selecting an optimal path in a multi-media multi-path network according to an embodiment of the present disclosure.

The method of selecting an optimal path in a multi-media multi-path network according to an embodiment of the present disclosure includes performing pre-processing to define an input value of a reinforcement learning algorithm for selection of an optimal path in the multi-media multi-path network (S310), obtaining a Q-table by applying the reinforcement learning algorithm to the input value (S320), and selecting an optimal path using the Q-table (S330).

In operation S310, network performance parameters, including a round trip time (RTT) and input arrival rate information, are defined as input values serving as state information.

In operation S320, learning is performed by matching the RTT with an action selection result of a previous section.

In operation S310, path selection results of other services are also reflected as state information when the input arrival rate information is reflected.

In operation S330, a path is selected in consideration of user profile information and service profile information.

Figure 4:
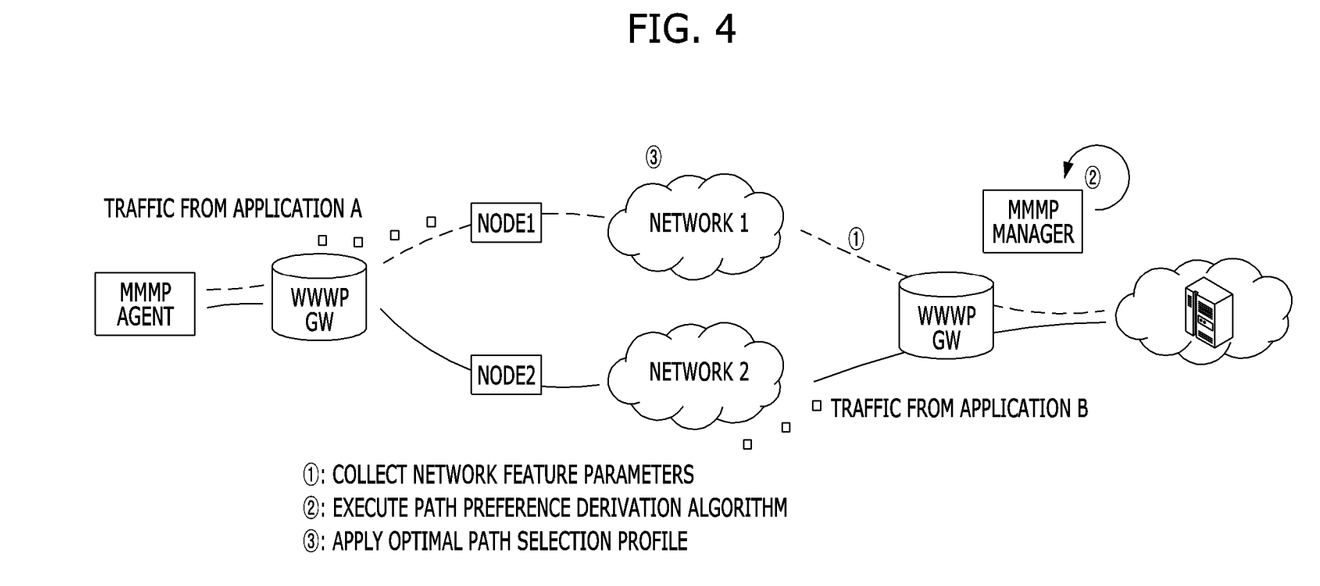
FIG. 4 illustrates an example of application of a multi-media multi-path network system according to an embodiment of the present disclosure.

FIG. 4 illustrates an example of application of a multi-media multi-path network system according to an embodiment of the present disclosure;

FIG. 4 illustrates a network path selection process. Referring to FIG. 4, before a path is selected, an RTT of the path is measured using a probing packet, and an MMMP manager derives a path selection result by reinforcement learning and transmits this result to an MMMP gateway (GW).

Figure 5:
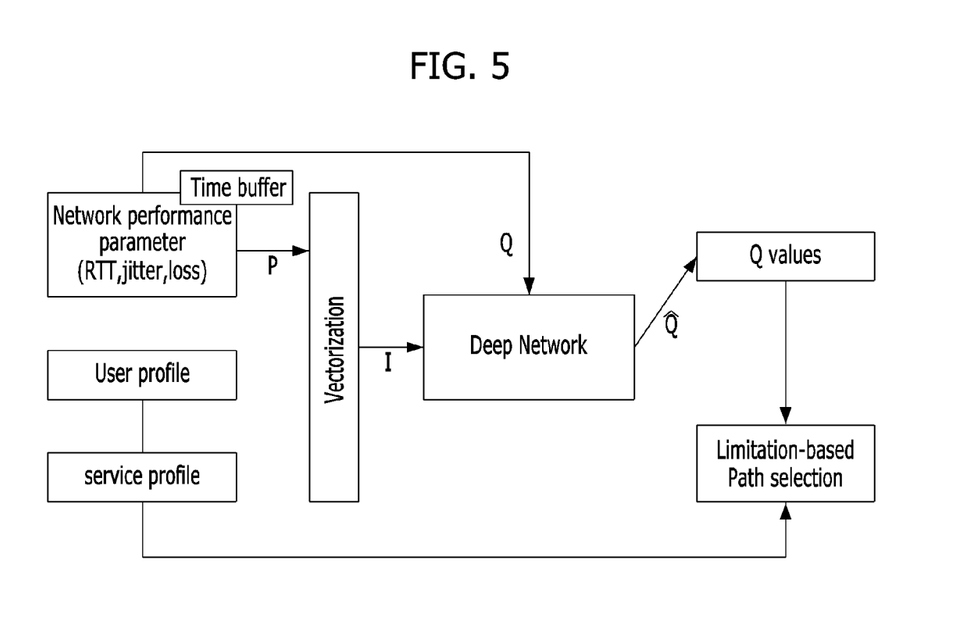
FIG. 5 illustrates a deep learning and reinforcement learning system model according to an embodiment of the present disclosure.

FIG. 5 illustrates a deep learning and reinforcement learning system model according to an embodiment of the present disclosure;

As illustrated in FIG. 5, network parameters are collected and used as input values of an artificial neural network, and a path is finally selected by reflecting requirements of a user profile and a service profile.

According to an embodiment of the present disclosure, cost-minimization learning is performed based on the difference between an actually obtained reward and a reward from a deep network.

As described above, according to an embodiment of the present disclosure, a path selection method includes pre-processing a reinforcement learning algorithm, applying the reinforcement learning algorithms, and performing post-processing.

In the pre-processing of the reinforcement learning algorithm, input values to be used for the reinforcement learning algorithm are defined and a method of processing the input values is defined.

The applying of the reinforcement learning algorithm uses deep Q learning.

In the performing of the post-processing, user/service constraints are reflected in path selection.

First, the pre-processing of the reinforcement learning algorithm will be described.

In the pre-processing of the reinforcement learning algorithm, data to be used as input values of the reinforcement learning algorithm is defined, and the input values correspond to state information in reinforcement learning.

Round-trip-time (RTT)-related information is included as a network performance parameter.

An RTT refers to a time required for a packet to arrive at a destination from a point of departure and return back to the point of departure and is a parameter most appropriate for intuitive identification of the quality of a path in a network system.

A high RTT should be understood to mean that the number of packets that are currently used via the path is large or that the speed of transmission via the path is low.

Therefore, it is important to periodically measure the RTT to be reflected into the quality of the path.

In one embodiment of the present disclosure, when RTTs are input, not only RTTs of all paths that are measured most recently but also a recent N-time RTT are used as input values.

According to an embodiment of the present disclosure, although an instantaneous RTT is a parameter appropriate for prediction of the quality of a path, whether there are too many or few packets destined for a corresponding path is determined on the basis of a change of the RTT.

Such RTT information is also used as a reward according to the path.

In reinforcement learning, when a path is selected by an algorithm, a gain obtained after the selection of the path is reflected as feedback. According to an embodiment of the present disclosure, the feedback is regarded as a change in the RTT of the selected path.

Input-arrival-rate-related information is included as a network performance parameter.

In the case of general reinforcement learning, input-arrival-rate-related information is action-related information. Assuming that the RTTs of all paths represent states and a path selected according to the RTTs represents an action, the action is merely an action selected for one service, not an action of all services.

In one embodiment of the present disclosure, in order to reflect actions of all services, path selection results of the other services are also reflected as state information.

In the applying of the reinforcement learning algorithm, an action (a path selection result) to be selected by the algorithm is selected on the basis of the above-described state.

In general, Q learning is a learning algorithm that selects an action in a given state according to rules thereof, stores information regarding a reward for the action in a Q-table, and takes an appropriate action on the basis of already updated values of the Q-table.

When the number of state parameters to be handled in the pre-processing of the reinforcement learning algorithm is extremely large, the speed of updating the Q-table becomes low and thus it is difficult to directly apply Q learning.

Therefore, according to an embodiment of the present disclosure, deep Q learning is used to predict the Q-table using a deep network without directly updating the Q-table.

Referring to FIG. 5, RTT information and input rate information for each path are input as input values of the reinforcement learning algorithm, and recommended path information (Q-table) for a corresponding user/service is output as an output value of the reinforcement learning algorithm.

The post-processing according to an embodiment of the present disclosure is a process of processing a limiting condition for each user/service, in which path selection is performed in consideration of user profile information and service profile information.

That is, in the finally selecting of the path based on a Q value predicted by deep Q learning, a path having a highest Q value among paths shown in the Q-table obtained by deep Q learning is basically selected. However, according to an embodiment of the present disclosure, a path is selected by reflecting whether multi-path transmission is to be performed and a quality requirement parameter for each user/service using a user/service profile.

For example, two paths having the highest Q value are selected as multiple paths in the case of a user requesting multi-path transmission, and paths having an RTT of 5 ms or more are excluded from selection of paths in the case of a service requiring a path with a delay value of 5 ms or less.

When a service that satisfies network quality requirements is not available, an optimal path is assigned.

Basically, in reinforcement learning, an optimal reward is searched for from among rewards given following an action according to a change of a reward value.

However, according to the related art, a reward is not given for a corresponding action (path selection), a reward value is not obtained immediately, and it is impossible to know exactly when the reward value is obtained.

Therefore, according to an embodiment of the present disclosure, a problem caused by asynchronicity is fixed using a time buffer.

Figure 6:
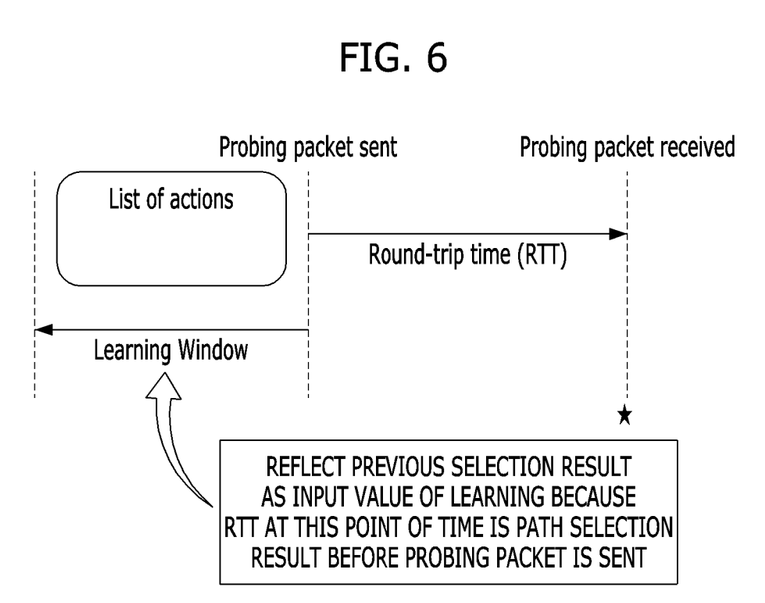
FIG. 6 illustrates taking asynchronicity between an action and compensation into consideration according to an embodiment of the present disclosure.

In addition, referring to FIG. 6, which illustrates taking asynchronicity between an action and a reward into consideration according to an embodiment of the present disclosure, learning is performed by matching a measured delay in a path with an action selection result in a previous section (learning window) rather than a current action selection result.

When a specific change occurs, it is theoretically possible to detect a change in a situation through ε-random selection but many diverge cases may occur.

In one embodiment of the present disclosure, a lifecycle is employed in a deep network.

Figure 7:
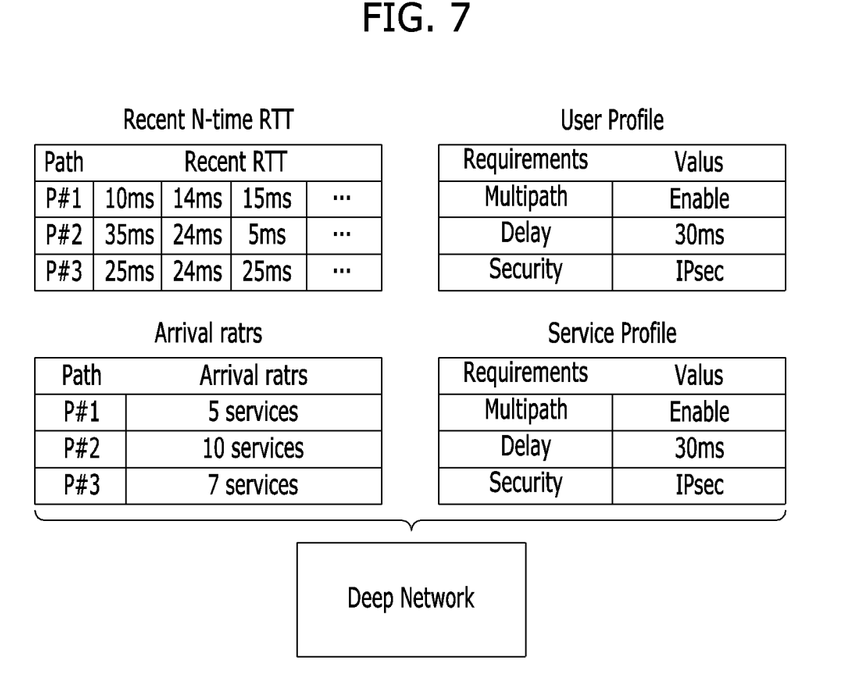
FIG. 7 illustrates reflecting input information and a recommended result according to an embodiment of the present disclosure.

FIG. 7 illustrates reflecting input information and a recommended result according to an embodiment of the present disclosure.

Referring to FIG. 7, a recent N-time RTT and arrival rates (latest path selection rates) are used as input values of an artificial neural network, and a user profile and a service profile are not input values of the artificial neural network but are used to reflect user/service requirements into a recommendation result of the artificial neural network.

Figure 8:
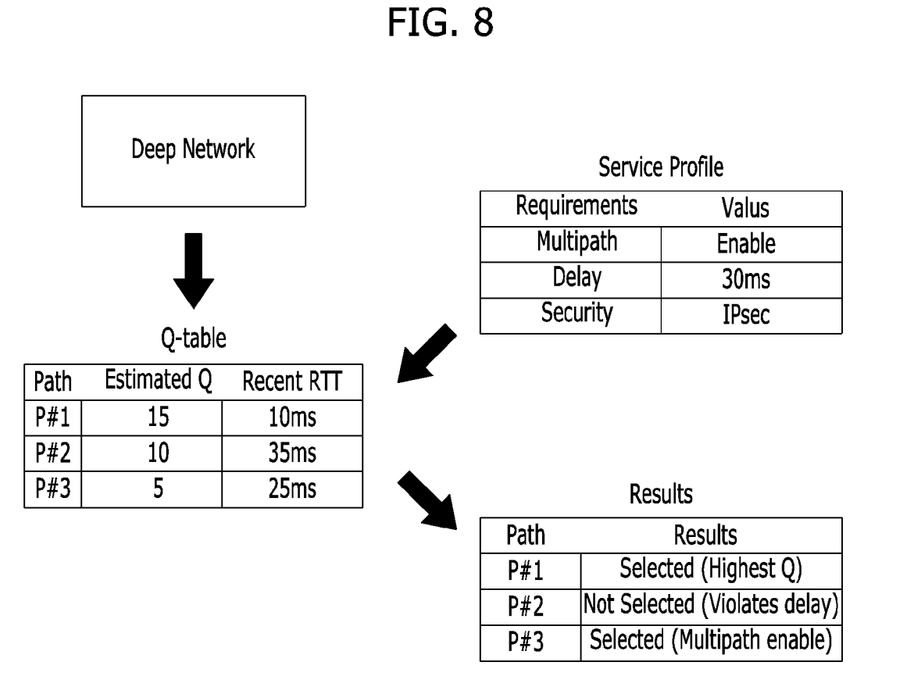
FIG. 8 illustrates a final path selection process according to an embodiment of the present disclosure.

FIG. 8 illustrates a final path selection process according to an embodiment of the present disclosure, assuming that a recommendation result of an artificial neural network and service requirements conflict with each other.

According to the service requirements, because multiple paths are enabled, two or more paths should be selected.

As a result of reinforcement learning, a path 1 and a path 2 should be selected but a recent RRT of the path 2 does not meet 30 ms, which is one of the service requirements.

Therefore, according to an embodiment of the present disclosure, an algorithm is adjusted to select the path 1 and the path 3.

According to an embodiment of the present disclosure, after learning is performed for a predetermined time period, path selection can be operated in real time, and an optimal path can be selected in consideration of a change of paths, as well as instantaneous information of the paths.

Effects of the present disclosure are not limited to those described above, and other effects not mentioned herein will be clearly understood by those of ordinary skill in the art from the detailed description.

A method of selecting an optimal path in a multi-media multi-path network according to an embodiment of the present disclosure can be implemented in a computer system or recorded on a recording medium. The computer system may include at least one processor, memory, a user input device, a data communication bus, a user output device, and storage. Each of the above components may establish data communication with one another via the data communication bus.

The computer system may further include a network interface coupled to a network. The processor may be a central processing unit (CPU) or a semiconductor device for processing instructions stored in the memory and/or the storage.

The memory and the storage may include various forms of volatile or nonvolatile storage media. For example, the memory may include a read-only memory (ROM) and a random access memory (RAM).

Therefore, a method of selecting an optimal path in a multi-media multi-path network according to an embodiment of the present disclosure may be embodied as a computer executable method. When the method of selecting an optimal path in the multi-media multi-path network according to an embodiment of the present disclosure is performed by a computer device, the method according to the present disclosure may be implemented using computer-readable instructions.

The method of selecting an optimal path in the multi-media multi-path network according to the present disclosure can be implemented as computer-readable code on a non-transitory computer-readable recording medium. The non-transitory computer-readable recording medium should be understood to include all types of recording media storing data interpretable by a computer system. Examples of the non-transitory computer-readable recording medium include a ROM, a RAM, magnetic tape, a magnetic disk, a flash memory, an optical data storage device, and so on. The non-transitory computer-readable recording medium can also be distributed over computer systems connected via a computer network and stored and implemented as code readable in a distributed fashion.

The present disclosure has been described above with respect to embodiments thereof. It will be understood by those of ordinary skill in the art that the present disclosure may be embodied in many different forms without departing from essential features of the present disclosure. Therefore, the embodiments set forth herein should be considered in a descriptive sense only and not for purposes of limitation. The scope of the present disclosure is set forth in the claims rather than in the foregoing description, and all differences falling within a scope equivalent thereto should be construed as being included in the present disclosure.

The components described in the example embodiments may be implemented by hardware components including, for example, at least one digital signal processor (DSP), a processor, a controller, an application-specific integrated circuit (ASIC), a programmable logic element, such as an FPGA, other electronic devices, or combinations thereof. At least some of the functions or the processes described in the example embodiments may be implemented by software, and the software may be recorded on a recording medium. The components, the functions, and the processes described in the example embodiments may be implemented by a combination of hardware and software. The method according to example embodiments may be embodied as a program that is executable by a computer, and may be implemented as various recording media such as a magnetic storage medium, an optical reading medium, and a digital storage medium. Various techniques described herein may be implemented as digital electronic circuitry, or as computer hardware, firmware, software, or combinations thereof. The techniques may be implemented as a computer program product, i.e., a computer program tangibly embodied in an information carrier, e.g., in a machine-readable storage device (for example, a computer-readable medium) or in a propagated signal for processing by, or to control an operation of a data processing apparatus, e.g., a programmable processor, a computer, or multiple computers. A computer program(s) may be written in any form of a programming language, including compiled or interpreted languages and may be deployed in any form including a stand-alone program or a module, a component, a subroutine, or other units suitable for use in a computing environment. A computer program may be deployed to be executed on one computer or on multiple computers at one site or distributed across multiple sites and interconnected by a communication network. Processors suitable for execution of a computer program include, by way of example, both general and special purpose microprocessors, and any one or more processors of any kind of digital computer. Generally, a processor will receive instructions and data from a read-only memory or a random access memory or both. Elements of a computer may include at least one processor to execute instructions and one or more memory devices to store instructions and data. Generally, a computer will also include or be coupled to receive data from, transfer data to, or perform both on one or more mass storage devices to store data, e.g., magnetic, magneto-optical disks, or optical disks. Examples of information carriers suitable for embodying computer program instructions and data include semiconductor memory devices, for example, magnetic media such as a hard disk, a floppy disk, and a magnetic tape, optical media such as a compact disk read only memory (CD-ROM), a digital video disk (DVD), etc. and magneto-optical media such as a floptical disk, and a read only memory (ROM), a random access memory (RAM), a flash memory, an erasable programmable ROM (EPROM), and an electrically erasable programmable ROM (EEPROM) and any other known computer readable medium. A processor and a memory may be supplemented by, or integrated into, a special purpose logic circuit. The processor may run an operating system (OS) and one or more software applications that run on the OS. The processor device also may access, store, manipulate, process, and create data in response to execution of the software. For purpose of simplicity, the description of a processor device is used as singular; however, one skilled in the art will be appreciated that a processor device may include multiple processing elements and/or multiple types of processing elements. For example, a processor device may include multiple processors or a processor and a controller. In addition, different processing configurations are possible, such as parallel processors. Also, non-transitory computer-readable media may be any available media that may be accessed by a computer, and may include both computer storage media and transmission media. The present specification includes details of a number of specific implements, but it should be understood that the details do not limit any invention or what is claimable in the specification but rather describe features of the specific example embodiment. Features described in the specification in the context of individual example embodiments may be implemented as a combination in a single example embodiment. In contrast, various features described in the specification in the context of a single example embodiment may be implemented in multiple example embodiments individually or in an appropriate sub-combination. Furthermore, the features may operate in a specific combination and may be initially described as claimed in the combination, but one or more features may be excluded from the claimed combination in some cases, and the claimed combination may be changed into a sub-combination or a modification of a sub-combination. Similarly, even though operations are described in a specific order on the drawings, it should not be understood as the operations needing to be performed in the specific order or in sequence to obtain desired results or as all the operations needing to be performed. In a specific case, multitasking and parallel processing may be advantageous. In addition, it should not be understood as requiring a separation of various apparatus components in the above described example embodiments in all example embodiments, and it should be understood that the above-described program components and apparatuses may be incorporated into a single software product or may be packaged in multiple software products. It should be understood that the example embodiments disclosed herein are merely illustrative and are not intended to limit the scope of the invention. It will be apparent to one of ordinary skill in the art that various modifications of the example embodiments may be made without departing from the spirit and scope of the claims and their equivalents.

What is claimed is:

1. A system for selecting an optical path in a multi-path network, the system comprising:
    a memory storing a program for selection of an optimal path in the multi-path network; and
    a processor configured to execute the program,
    wherein the processor uses a network performance parameter, which serves as state information, as an input value of a reinforcement learning algorithm and selects an optimal path using a Q-table obtained by applying the reinforcement learning algorithm,
    wherein the processor predicts the Q-table by applying a deep Q learning algorithm and outputs recommended path information for a corresponding user and service, and
    wherein the processor selects a path by considering whether multi-path transmission is to be performed and considering quality requirement values of the user and the service as user profile information and service profile information.

2. The system of claim 1, wherein the network performance parameter comprises a round trip time (RTT) and input arrival rate information.

3. The system of claim 2, wherein the processor performs learning by matching the RTT with an action selection result of a previous section.

4. The system of claim 3, wherein the processor uses a predetermined RTT of an N-time previous section as an input value.

5. The system of claim 2, wherein the processor reflects the input arrival rate information as state information, together with path selection results of other services.

6. The system of claim 1, wherein the processor performs learning considering asynchronicity between an action and a reward using a time buffer.

7. A method of selecting an optical path in a multi-path network, the method comprising:
    (a) performing pre-processing to define an input value of a reinforcement learning algorithm for selection of an optimal path in the multi-path network;
    (b) obtaining a Q-table by applying the reinforcement learning algorithm to the input value; and
    (c) selecting an optimal path using the Q-table,
    wherein (a) comprises defining a network performance parameter, which serves as state information, as the input value, the network performance parameter including a round trip time (RTT) and input arrival rate information, and
    wherein (c) comprises selecting a path by considering whether multi-path transmission is to be performed and considering quality requirement values of a user and a service as user profile information and service profile information.

8. The method of claim 7, wherein (b) comprises performing learning by matching the RTT with an action selection result of a previous section.

9. The method of claim 7, wherein (a) comprises reflecting the input arrival rate information as state information, together with path selection results of other services.

* * * * *